(12) United States Patent
Peet et al.

(10) Patent No.: US 10,584,059 B2
(45) Date of Patent: Mar. 10, 2020

(54) GLASS MAT AND METHOD OF MAKING THE GLASS MAT

(71) Applicant: SAINT-GOBAIN ADFORS CANADA, LTD., Grand Island, NY (US)

(72) Inventors: Jeffrey H. Peet, Southborough, MA (US); Nancy E. Brown, New Braintree, MA (US); Tao Yu, Wellesley, MA (US); Gary Charles Hildreth, North Oxford, MA (US)

(73) Assignee: SAINT-GOBAIN ADFORS CANADA, LTD., Grand Island, NY (US)

( * ) Notice: Subject to any disclaimer, the term of this patent is extended or adjusted under 35 U.S.C. 154(b) by 494 days.

(21) Appl. No.: 15/199,266

(22) Filed: Jun. 30, 2016

(65) Prior Publication Data

US 2017/0002564 A1    Jan. 5, 2017

Related U.S. Application Data

(60) Provisional application No. 62/187,012, filed on Jun. 30, 2015.

(51) Int. Cl.
  *E04C 2/22*    (2006.01)
  *C03C 25/34*    (2006.01)
(52) U.S. Cl.
  CPC .................................. *C03C 25/34* (2013.01)
(58) Field of Classification Search
  None
  See application file for complete search history.

(56) References Cited

U.S. PATENT DOCUMENTS

| 2,083,527 A | 6/1937 | Bierer |
| 3,082,143 A | 3/1963 | Smith |

(Continued)

FOREIGN PATENT DOCUMENTS

| EP | 2309046 A1 | 4/2011 |
| EP | 2637982 A1 | 6/2013 |

(Continued)

OTHER PUBLICATIONS

International Search Report from PCT/US2016/040484 dated Nov. 10, 2016, 1 pg.

*Primary Examiner* — Monica A Huson
*Assistant Examiner* — Kelsey C Grace
(74) *Attorney, Agent, or Firm* — Abel Schillinger, LLP; Thomas H Osborn

(57) ABSTRACT

A method of making a glass mat includes providing an assembly of glass fibers, applying a binder composition to the assembly of glass fibers, wherein the binder includes an organic resin, and curing the binder composition while dimensionally constraining the assembly of glass fibers. Dimensional constraining includes directly contacting a first major surface and a second major surface of the assembly of glass fibers between two substantially parallel surfaces. Further provided is a glass mat that includes an assembly of glass fibers, wherein the assembly of glass fibers are substantially randomly oriented with a tensile anisotropy of less than about 6 in any two directions. The glass mat has a decreased surface roughness and a decreased caliper compared to an equivalent glass mat having an assembly of naturally packed glass fibers with an equivalent fiber diameter size.

8 Claims, 8 Drawing Sheets

(56) References Cited

U.S. PATENT DOCUMENTS

| | | |
|---|---|---|
| 4,118,533 A | 10/1978 | Hipchen et al. |
| 4,258,098 A | 3/1981 | Bondoc et al. |
| 4,430,158 A | 2/1984 | Jackey et al. |
| 4,506,060 A | 3/1985 | White, Sr. et al. |
| 4,542,068 A | 9/1985 | Whichard |
| 4,560,612 A | 12/1985 | Yau |
| 4,810,576 A | 3/1989 | Gaa et al. |
| 4,835,045 A | 5/1989 | Kielmeyer et al. |
| 4,917,764 A | 4/1990 | Lalwani et al. |
| 5,334,648 A | 8/1994 | Drews et al. |
| 5,445,878 A | 8/1995 | Mirous |
| 5,518,586 A | 5/1996 | Mirous |
| 5,547,743 A | 8/1996 | Rumiesz et al. |
| 5,851,933 A | 12/1998 | Swartz et al. |
| 7,172,678 B2 | 2/2007 | Canfield et al. |
| 7,272,915 B2 | 9/2007 | Peng |
| 7,669,303 B2 | 3/2010 | Droux et al. |
| 7,927,459 B2 | 4/2011 | Huang et al. |
| 8,173,219 B2 | 5/2012 | Tutin et al. |
| 8,590,267 B2 | 11/2013 | Jaffee |
| 8,703,628 B2 | 4/2014 | Tutin et al. |
| 2004/0256068 A1 | 12/2004 | Canfield et al. |
| 2008/0003902 A1* | 1/2008 | Boyer .............. B32B 17/02 442/59 |
| 2010/0087114 A1 | 4/2010 | Bush et al. |
| 2010/0273376 A1* | 10/2010 | Jaffee .............. B32B 5/26 442/17 |
| 2012/0064295 A1 | 3/2012 | Klett et al. |
| 2012/0148806 A1* | 6/2012 | Dubey ............ B28B 19/0092 428/193 |
| 2013/0045352 A1 | 2/2013 | Kern et al. |
| 2014/0364029 A1 | 12/2014 | Hawkins et al. |
| 2016/0040427 A1 | 2/2016 | Li et al. |

FOREIGN PATENT DOCUMENTS

| | | |
|---|---|---|
| WO | 2001098064 A2 | 12/2001 |
| WO | WO-2012062801 A1 | 5/2012 |

* cited by examiner

GLASS MAT AND METHOD OF MAKING THE GLASS MAT

CROSS-REFERENCE TO RELATED APPLICATION

This application claims priority under 35 U.S.C. § 119(e) to U.S. Provisional App. No. 62/187,012, entitled "A GLASS MAT AND METHOD OF MAKING THE GLASS MAT", by Jeffrey H. Peet et al., filed Jun. 30, 2015, which is assigned to the current assignee hereof and incorporated herein by reference in its entirety.

FIELD OF THE DISCLOSURE

The present disclosure relates to a glass mat and in particular, a glass mat for construction products.

BACKGROUND

Building materials for construction, such as gypsum wall boards, cement boards, tiles, and roofing shingles, are typically constructed with a glass fiber mat. Chopped strand mat, suitable for use in construction materials, generally includes glass fibers because they are of high strength and tend not to shrink during use. The glass fibers are typically formed by attenuating streams of molten glass material from a bushing. The fibers are drawn from the bushing and the fibers are then chopped directly into a container. The chopped fibers are then dispersed in a water slurry which contains surfactants, viscosity modifiers, dispersants and other chemical agents. The fibers and slurry are agitated to disperse the fibers prior to depositing the mixture onto a moving screen where most of the water is removed. Although this generally describes a wet-laid process, a dry-laid process may be used. A polymeric binder is then applied. After application of the polymeric binder, the resulting mat is heated to remove the remaining water and cure the binder.

Important properties for a glass mat include surface roughness, caliper, tensile strength, and tear strength. These properties are useful in determining the efficacy of the manufacture of glass mat products and final properties of the glass mat. Modifications to the glass mats to improve such properties are desired.

Accordingly, a need continues to exist in the art for improved processes for manufacturing glass mats that can lower product cost and meet the needs of new and demanding applications.

SUMMARY

In an embodiment, a method of making a glass mat includes providing an assembly of glass fibers; applying a binder composition to the assembly of glass fibers, wherein the binder includes an organic resin; and curing the binder composition while dimensionally constraining the assembly of glass fibers, wherein dimensional constraining includes directly contacting a first major surface and a second major surface of the assembly of glass fibers between two substantially parallel surfaces.

In another embodiment, a glass mat includes an assembly of glass fibers, wherein the assembly of glass fibers are substantially randomly oriented with a tensile anisotropy of less than about 6 in any two directions; and a binder composition including an organic resin; wherein the glass mat has a surface roughness more than about 10% lower than an equivalent glass mat having an assembly of naturally packed glass fibers with an equivalent fiber diameter size.

In yet another embodiment, a glass mat includes an assembly of glass fibers, wherein the assembly of glass fibers are substantially randomly oriented with a tensile anisotropy of less than about 6 in any two directions; and a binder composition including an organic resin; wherein the glass mat has a caliper more than about 10% lower than an equivalent glass mat having an assembly of naturally packed glass fibers with an equivalent fiber diameter size.

BRIEF DESCRIPTION OF THE DRAWINGS

Embodiments are illustrated by way of example and are not limited in the accompanying figures.

Figure 1:
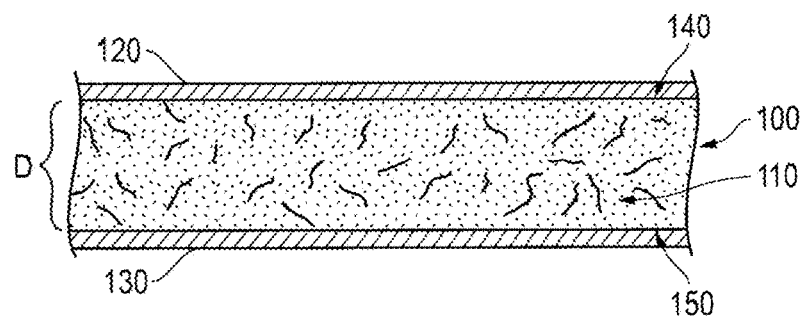
FIG. 1 includes a cross-sectional view of a portion of a glass mat during cure under dimensional constraint illustrated in accordance with an embodiment described herein.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises", "comprising", "includes", "including", "has", "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts.

In an embodiment, the present invention provides a glass mat. The glass mat includes an assembly of glass fibers; and a binder composition including an organic resin. The glass mat is formed by a method that includes curing the binder while the mat and the binder are under a dimensional constraint. Like a glass mat formed absent any dimensional constraint, the glass mat when cured under dimensional constraint has substantially randomly oriented glass fibers having a tensile anisotropy of less than about 6 in any two directions. In an embodiment, the glass mat has a decreased surface roughness compared to an equivalent glass mat having an assembly of naturally packed glass fibers with an equivalent fiber diameter size. In a further embodiment, the glass mat has a decreased caliper compared to an equivalent glass mat having an assembly of naturally packed glass fibers with an equivalent fiber diameter size.

In a particular example, the glass mat is advantageously produced by curing the binder composition of the glass mat while the assembly of glass fibers is under dimensional constraint. In an embodiment, any dimensional constraint is envisioned that constrains and prevents expansion of the assembly of glass fibers and binder composition during cure. This is in contrast to a glass mat having an assembly of naturally packed glass fibers. As used herein, "naturally packed glass fibers" include an assembly of glass fibers and a binder composition wherein the binder composition is not cured under dimensional constraint. Without dimensional constraint applied to the glass mat during cure, the thickness, length, width, or combination thereof of the glass mat will expand during the cure of the binder. In particular, the cure of the binder creates voids within the binder which bridges the glass fibers within the mat, causing the glass mat to expand resulting in naturally packed glass fibers. Although not being bound by theory, the voids can be created by moisture released during the curing reaction and/or boiling off of the solvent during cure. However, when the assembly of glass fibers is cured under dimensional constraint, the assembly of glass fibers is prevented from expanding. In a particular embodiment, the assembly of glass fibers is prevented from expanded in the vertical direction. With the use of dimensional constraint, the expansion of the glass mat is prevented such that the glass mat has a reduced caliper, such as more than about 10% lower, more than about 20% lower, or even 30% lower, compared to an equivalent glass mat having an assembly of naturally packed glass fibers with an equivalent fiber diameter size. Additionally, even though a lower caliper is achieved by curing the binder of the glass mat under dimensional constraint, any caliper less than that of the naturally packed glass mat is envisioned. Typically, the glass mat can have any caliper desired. In an example, the caliper is at least about 5 mil, such as about 5 mil to about 200 mil, such as about 10 mil to about 75 mil, such as about 10 mil to about 40 mil, such as about 10 mil to about 30 mil, such as about 10 mil to about 25 mil. In an example, the caliper of the glass mat is not greater than about 200 mil, such as not greater than about 100 mil, such as not greater than 50 mil. Due to the brittle nature of both glass fibers and cured binder, it is surprising that a glass mat can be constrained with sufficient pressure during cure to prevent expansion without damaging the glass fibers and thereby reducing glass strength.

In addition to reduced caliper, the glass mat cured while subjected to dimensional constraint has substantially randomly oriented glass fibers having a tensile anisotropy of less than about 6 in any two directions, such as about 1 to about 4, such as about 1.1 to about 4, such as about 1.2 to about 4. In an embodiment, the two directions are the machine direction and the cross direction, which is substantially perpendicular to the machine direction. "Tensile anisotropy" as used herein refers to the ratio of the tensile strength of the glass mat taken in any two directions. In the case of a typical wet laid glass mat, with or without dimensional constraint, the tensile anisotropy will be highest when comparing the machine direction and the cross direction. In other assemblies of glass fibers, the maximum anisotropy may be found when comparing different directions. In comparison, an equivalent glass mat having an assembly of perfectly randomly oriented glass fibers would have a tensile anisotropy of about 1 in any two directions. As such, the perfectly randomly oriented glass mat would have tensile isotropy, which implies a generally random direction of the assembly of glass fibers, i.e. with no structural order of the fibers.

In particular, curing under dimensional constraint provides an advantageous surface roughness of the glass mat. Due to the cure under dimensional constraint, the glass mat has a decreased surface roughness, such as less than about 10%, such as less than about 20%, or even less than about 30%, compared to an equivalent glass mat having an assembly of naturally packed glass fibers with an equivalent fiber diameter size. Unexpectedly, curing the glass mat under dimensional constraint not only provides smoothness on the surface of the glass mat but also does not substantially damage the glass fibers. "Substantial damage" as used herein refers to breakage of at least 20% of the glass fibers, resulting in a reduction in the tensile properties of the glass mat.

In another embodiment, a glass mat having an assembly of glass fibers with a larger micron fiber diameter size cured under dimensional constraint can be obtained with a surface roughness equivalent or less than a glass mat with an assembly of glass fibers having a smaller micron fiber diameter size cured without dimensional constraint. With conventional cure, desirable smoothness of the glass mat having an assembly of naturally packed glass fibers was achieved by decreasing the diameter of the glass fibers. However, dimensional constraint provides a decreased surface roughness for fibers of greater diameter size not before achieved with conventional cure.

In an embodiment, glass fibers having a diameter of about 11 microns, such about 13 microns, or even about 16 microns used in a glass mat dimensionally constrained during cure provides a glass mat with a surface roughness (Sq) of less than about 200 μm (root mean square of the surface area in micons), such as less than about 140 μm, or even less than about 120 μm for a 16 micron diameter assembly of glass fibers.

Furthermore, dimensional constraint during cure provides a glass mat with a uniform thickness across a total width of the glass mat. For instance, the thickness of the mat varies not greater than about 10% over the total width of the glass mat. In an embodiment, the Pz value is not greater than 1000 um, such as not greater than 800 um, such as not greater than 700 um, or even not greater than 600 um when measured via a Nanovea 3D Optical Surface Profilometer using a white light chromatic aberration technique with 7.5 centimeter line scan in any particular direction. Accordingly, the glass mat has a flatness that is desirable, especially for construction applications where a uniform mat is desired. In comparison, an assembly of naturally packed glass fibers not cured under dimensional constraint may have a thickness that varies across the total width of the glass mat by at least 15%. In a further embodiment, the glass mat has a higher packing density, such as greater than about 30%, such as 40%, or even 50%, compared to a glass mat having the assembly of naturally packed glass fibers with equivalent fiber diameter size that are not cured under dimensional constraint.

Prior to the cure of the glass mat, an exemplary method of forming a glass fiber mat in accordance with the present invention begins with an assembly of fibers, such as chopped bundles of glass fibers of suitable length. In a particular embodiment, the assembly of fibers can be any length such as continuous strand, chopped, or combination thereof. In a more particular embodiment, the assembly of fibers is chopped into a suitable length to provide randomly disposed fibers. Any reasonable length of fibers is envisioned. Any reasonable diameter of the fibers is envisioned. Generally, fibers having a length of about 0.5 inches to about 3 inches and a diameter of at least about 3 microns, such as about 3 microns to about 30 microns, such as about 3 microns to 20 microns, such as at least about 11 microns, such as about 13 microns, or even 16 microns are used. In a particular embodiment, the fibers have a diameter of about 11 microns to about 16 microns. Each assembly may contain any reasonable amount of fibers. The assembly of fibers can include a variety of suitable materials. For instance, the assembly of fibers can include a glass fiber, such as a fiber made from A-type glass fiber, a C-type glass fiber, an E-type glass fiber, an S-type glass fiber, an E-CR-type glass fiber, a wool glass fiber, a synthetic fiber, a natural fiber, or a combination thereof. Any suitable configuration of the assembly of fibers is envisioned. In an embodiment, the assembly of fibers may be in a non-woven mat.

An exemplary method of making the glass mat includes providing the assembly of glass fibers. Typically, the assembly of fibers is added to a dispersant medium to form an aqueous slurry, known in the art as "white water". The white water typically contains glass, dispersant(s), viscosity modifier(s), foam control and biocide additives. The fibrous slurry is then agitated to form a workable, uniform dispersion of glass fiber having a suitable consistency. The dispersant may contain polyacrylamide, hydroxyethyl cellulose, and other additive such as surfactants, lubricants, defoamers, the like, or combinations thereof.

The fiber and white water dispersion is then passed onto a mat-forming machine containing a mat forming screen. The dispersion is usually diluted with water to a lower fiber concentration prior to being dispersed on a screen. The fibers are collected at the screen in the form of a wet fiber mat, and the excess water is removed by gravity or, more preferably, by vacuum in a conventional manner, such as by vacuum boxes. Although this generally describes a wet-laid process, a dry-laid process may also be envisioned. For instance, with a dry-laid process, fibers may be spun from a bushing directly onto a moving web. The binder composition is subsequently applied.

The binder composition is used to fixedly bond the assembly of fibers. The binder composition is traditionally applied to the gravity- or vacuum-assisted de-watered white glass mat. Application of the binder composition may be accomplished by any conventional means, such as by soaking the mat in an excess of binder solution, or by coating the mat surface by means of a binder applicator such as a sprayer, roll, or curtain. The components of the binder composition may be applied separately or mixed together by any method envisioned. For instance, if applied separately, the components of the binder composition may be added by the same or a different method. In an embodiment, any other sequence of adding the components of the binder composition is envisioned. The total concentration of components in the binder composition in an aqueous solution can vary widely in accordance with the practice of the present invention. Any amount of binder composition is envisioned but it will usually be found convenient and satisfactory to make up this composition in the range from about 5% by weight to about 50% by weight, such as about 10% by weight to about 40% by weight, such as about 10% by weight to about 30% by weight of the cured glass mat.

The binder composition includes any suitable organic resin. The organic resin can include one or more suitable monomers, oligomers, polymers, copolymers, a suitable blend, or combination thereof. In a particular embodiment, the organic resin is any reasonable resin envisioned for glass mat applications. In an embodiment, the organic resin comprises one or several of a urea-formaldehyde composition, a latex composition, an acrylic composition, a styrene-butadiene rubber (SBR) composition, a vinyl acetate ethylene composition, a blend or combination thereof. In a particular embodiment, the organic resin comprises a urea-formaldehyde composition, a latex composition, or combination thereof. In an embodiment, the latex is present at an amount of up to about 5% by weight, such as up to about 7% by weight, or even up to about 100% by weight, based on the total weight % of the binder composition.

The binder composition may also contain a variety of other known additives such as an adhesion promoter to enhance the adhesion of the binder composition to the glass mat to increase the bonding strength between the assembly of fibers, a silica colloid to enhance fire resistance, antifoamers, biocides, pigments, the like, or combinations thereof. In an embodiment, the binder composition can include less than about 25% by weight of additives, based on the total weight of the binder composition. In another embodiment, the binder composition is substantially free of additives. "Substantially free" as used herein refers to less than about 1% by weight of additives, less than about 0.5% by weight of additives, or even less than about 0.1% by weight of additives, based on the total weight of the binder composition.

Following application of the binder composition, the glass fiber mat is de-watered by any reasonable means, such as under vacuum, to remove excess binder solution. In an embodiment, the mat is dried prior to cure. Any method of drying the glass mat is envisioned. In a particular embodiment, the drying is at a temperature wherein the glass mat does not reach the cure temperature of the binder and is dependent upon the binder chosen. For instance, drying is with forced heated air, such as a convection oven, a gas fired oven, an infrared heater, a heated drum, or combination thereof. In an exemplary embodiment, at least about 95%, such as at least about 90%, or even at least about 80% of water weight of the aqueous binder is removed during the drying process. In an embodiment, the binder is partially cured during the drying step, with a cure of not greater than a 50%, as measured by a ratio of dry tensile strength to tensile strength of a wet glass mat subjected to 10 minutes exposure to 80° C. hot water.

The glass mat is subjected to final curing of the binder under dimensional constraint. Any method of applying the dimensional constraint is envisioned, such as two substantially parallel surfaces. For instance, a first major surface and a second major surface of the glass mat are in directly in contact with two substantially parallel surfaces. The substantially parallel surfaces may be in any geometric configuration envisioned, such as flat, round, or combination thereof. In an embodiment, the glass mat is placed between at least one metal surface, at least one fabric belt, or combination thereof. In an alternate embodiment, the mat could be constrained between a flat surface, such as a metal plate, and an open surface, such as a woven belt. In a further alternate embodiment, at least one of the substantially parallel surfaces could be patterned to impart a specific desirable texture on the cured mat. In a particular embodiment, the constraining material has a desirable thermal conductivity, such as greater than about 10 W/m·K. In a particular embodiment, the thermal conductivity is desirable to heat the constraining material, such as at least one of the substantially parallel surfaces, or even both substantially parallel surfaces, to a temperature sufficient to heat the mat and cure the binder composition. In an even more particular embodiment, the constraining material is at least one metal plate having a thermal conductivity greater than about 10 W/m·K. In an exemplary embodiment, the glass mat is dimensionally constrained by substantially parallel surfaces on a rotocure, a conveyor belt, i.e. flat bed, or combination thereof. In an embodiment, a pressure is applied to the mat during dimensional constraint. In a more particular embodiment, the pressure is at least about 0.01 psi (pounds per square inch), such as at least about 0.02 psi, such as at least about 0.03 psi, such as at least about 0.04 psi, such as at least about 0.05 psi, such as at least about 1.0 psi, such as at least about 5.0 psi, or even greater, with the proviso that the pressure does not substantially damage the glass fibers.

Turning to FIG. 1, a cross-sectional view of a portion of a glass mat 100 is illustrated under dimensional constraint during cure in accordance with an embodiment described herein. The glass mat 100 includes an assembly of filaments 110 where the assembly of filaments 110 includes a binder composition thereon (not shown). Further included are substantially parallel metal plates 120 and 130 in direct contact with a first major surface 140 and a second major surface 150 of the glass mat 100. The distance between the substantially parallel metal plates 120 and 130 is represented by "D". Any distance is envisioned and is dependent upon the final thickness desired for the glass mat. Specifically, the thickness of the cured glass mat is substantially equal to the distance between the substantially parallel metal plates. In a particular embodiment, the dimensional constraint has a distance between the substantially parallel surfaces less than or equal to a thickness of a naturally cured glass mat.

In an embodiment, the cure of the binder is facilitated with heat provided by any reasonable means. Although cure is described by heating at least one parallel surface, such as a metal plate, to a temperature to heat the mat and cure the binder, any other methods of providing heat are also envisioned such as, for example, infrared heating. Any reasonable time and temperatures is envisioned and is dependent upon the binder composition and the desired process speed. In an embodiment, heat treatment is sufficient to effect curing. In an embodiment, catalytic curing may also be used. Dimensional constraint of the glass mat and cure of the binder occurs concurrently and may be provided by the same or different means. Although described as substantially parallel metal plates, any other configuration of the dimensional constraint may be envisioned.

The glass mat as described has advantageous and unexpected properties. In addition to the aforementioned surface roughness, caliper, and uniformity, the glass mat of the present invention has desirable properties such as tensile strength and tear strength compared to an equivalent glass mat having an assembly of naturally packed glass fibers with an equivalent fiber diameter size. For instance, the glass mat has desirable tensile strength such as a dry tensile strength of about 100 N/inch to about 200 N/inch, such as about 100 N/inch to about 180 N/inch, or even about 100 N/inch to about 160 N/inch.

Due to the constraining of the fibers, the mat produced from constrained curing can also have improved handling properties. The itchy feeling often perceived by users of glass fabrics can be reduced by the use of the constrained curing process due to reduction of fiber ends pointing perpendicular to the surface of the mat.

The glass mat as described above can be provided in any suitable manner to provide for a construction product. Any construction product is envisioned where low caliper, smoothness, flatness, and tensile strength are desired. An exemplary construction product includes, for example, gypsum wall board, a cement board, a tile, and a roofing shingle.

In an embodiment, the construction product is a facer for a gypsum wall board or a cement board. The glass mat can be provided in the cementitious product to provide structural integrity to the resulting cementitious product. The glass mat may be situated in any suitable configuration within the cementitious product. In an embodiment, the glass mat can be adhered, affixed, or otherwise coupled to any suitable surface, edge, or face of an existing cementitious product. For example, the glass mat can be produced as described above and then adhered to a cured cementitious product. Alternatively, the glass mat can be produced simultaneously or concurrently while it is being coupled to a cementitious product. In an embodiment, at least a portion of the glass mat can be at least partially embedded to any suitable depth from a surface or edge of the cementitious product. For example, at least a portion of the glass mat can be embedded to between about 0.01 inches and about 0.25 inches from a surface or edge of the cementitious product. "Partially embedded," as used herein, refers to a depth within the cementitious product of at least about 0.01 inches. In a particular embodiment, the glass mat can be substantially embedded. "Substantially embedded," as used herein, refers to a depth within the cementitious product of at least about 0.05 inches. For example, the glass mat can be partially or substantially embedded in a cementitious slurry or mixture that is thereafter dried, hardened, or otherwise cured to provide a cementitious product with the glass mat partially or substantially embedded to a suitable depth from a surface or edge of the cementitious product. In an embodiment, the cementitious slurry substantially impregnates a plurality of interstices between the assembly of fibers. In a further embodiment, a cementitious product can include any suitable number of glass mats as described herein. For example, a cementitious product can include more than one glass mat, each of which can be at least partially embedded to a suitable depth from opposite major surfaces of the cementitious product. Any cementitious slurry is envisioned. In an embodiment, the cementitious slurry includes Portland cement, magnesia cement, alumina cement, gypsum, blends, or combinations thereof.

In a further embodiment, the glass mat may be coated with a polymer film coating. Any reasonable polymer film coating is envisioned. Typically, the polymer film coating chosen is dependent upon the final properties desired for the construction product. In an embodiment, the polymer film coating includes a latex, an ethylene methyl acrylate, ethylene vinyl acetate, polyethylene terephthalate, polyamide, hot melt adhesive, fluoropolymer, polyolefin, or combination thereof. The method of applying the polymer film coating is dependent upon the material. Any method is envisioned such as coating, extruding, spraying, or laminating. For instance, a polymer film coating may be extruded directly onto the glass mat without any intervening layers. In another embodiment, a polymer film coating may be laminated, with or without an adhesive, onto the glass mat.

In an example, the polymer film coating can be provided on the glass mat and can be positioned on any portion of the glass mat desired. In an embodiment, the polymer film coating can partially or substantially coat at least one surface the glass mat. In an embodiment, the polymer film coating can partially coat at least two surfaces of the glass mat. In a particular embodiment, the polymer film coating can substantially coat the glass mat and can penetrate the glass mat. The polymer film coating can also include more than one layer on the glass mat, each of which can be allowed to set, harden, dry, or otherwise cure before any additional layers of polymer film coating are applied. The polymer film coating can include any suitable thickness such as at least about 5 microns, or range of thicknesses, such as between about 5 microns and about 300 microns.

Any one or more suitable components are envisioned for the glass mat depending upon the final product and properties desired. In an embodiment, the glass mat can include one component such as a nonwoven laid scrim. In another embodiment, the glass mat can include more than one component, such as one or more scrims, either woven or nonwoven, suitably coupled to one or more mats, either woven or nonwoven. For example, a woven scrim including glass fibers can be coupled to a nonwoven mat including polymer fibers.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A method of making a glass mat including providing an assembly of glass fibers; applying a binder composition to the assembly of glass fibers, wherein the binder includes an organic resin; and curing the binder composition while dimensionally constraining the assembly of glass fibers, wherein dimensional constraining includes directly contacting a first major surface and a second major surface of the assembly of glass fibers between two substantially parallel surfaces.

Embodiment 2. A glass mat including an assembly of glass fibers, wherein the assembly of glass fibers are substantially randomly oriented with a tensile anisotropy of less than about 6 in any two directions; and a binder composition including an organic resin; wherein the glass mat has a surface roughness more than about 10% lower than an equivalent glass mat having an assembly of naturally packed glass fibers with an equivalent fiber diameter size.

Embodiment 3. A glass mat including an assembly of glass fibers, wherein the assembly of glass fibers are substantially randomly oriented with a tensile anisotropy of less than about 6 in any two directions; and a binder composition including an organic resin; wherein the glass mat has a caliper more than about 10% lower than an equivalent glass mat having an assembly of naturally packed glass fibers with an equivalent fiber diameter size.

Embodiment 4. The method or glass mat of any of the preceding embodiments, wherein the glass mat has a comparable tensile strength compared to an equivalent glass mat having an assembly of naturally packed glass fibers with an equivalent fiber diameter size.

Embodiment 5. The method or glass mat of any of the preceding embodiments, wherein the glass mat has a thickness that varies not greater than about 5% across the total width of the mat.

Embodiment 6. The method or glass mat of embodiment 1 or 2, wherein the glass mat has a caliper more than about 10% lower compared to an equivalent glass mat having an assembly of naturally packed glass fibers with an equivalent fiber diameter size.

Embodiment 7. The method or glass mat of embodiment 1 or 3, wherein the glass mat has a surface roughness more than about 10% lower compared to an equivalent glass mat having an assembly of naturally packed glass fibers with an equivalent fiber diameter size.

Embodiment 8. The method or glass mat of any of the preceding embodiments, wherein the organic resin includes a urea-formaldehyde composition, a latex composition, a styrene-butadiene rubber (SBR) composition, a vinyl acetate ethylene composition, a blend or combination thereof.

Embodiment 9. The method or glass mat of embodiment 8, wherein the binder composition includes the latex present at an amount of up to about 5% by weight, such as up to about 7% by weight, or even up to about 100% by weight, based on the total weight% of the binder composition.

Embodiment 10. The method or glass mat of any of the preceding embodiments, wherein the binder composition is about 5% by weight to about 50% by weight of the cured glass mat.

Embodiment 11. The method or glass mat of any of the preceding embodiments, wherein the assembly of fibers is a non-woven mat.

Embodiment 12. The method or glass mat of any of the preceding embodiments, wherein the assembly of glass fibers includes an A-type glass fiber, a C-type glass fiber, an E-type glass fiber, an S-type glass fiber, an E-CR-type glass fiber, a wool glass fiber, or a combination thereof.

Embodiment 13. The method of any of the preceding embodiments, wherein the dimensional constraint has a distance between the substantially parallel surfaces less than or equal to a thickness of the naturally cured glass mat.

Embodiment 14. The method of any of the preceding embodiments, wherein at least one of the substantially parallel surfaces has a thermal conductivity of at least about 10 W/m·K.

Embodiment 15. The method of embodiment 14, wherein curing the binder composition comprises heating at least one of the substantially parallel surfaces to a temperature sufficient to heat the mat and cure the binder composition.

Embodiment 16. The method of any of the preceding embodiments, further including substantially drying the glass mat prior to cure.

Embodiment 17. The method of embodiment 16, wherein drying the glass mat is at a temperature wherein the glass mat does not reach the cure temperature of the binder.

Embodiment 18. The method of any of the preceding embodiments, further comprising substantially embedding the glass mat in a cementitious slurry or applying a polymer film coating to the glass mat surface.

Embodiment 19. The method of embodiment 18, wherein the cementitious slurry comprises Portland cement, magnesia cement, alumina cement, gypsum, blends, or combinations thereof.

Embodiment 20. The method of embodiment 18, wherein the cementitious slurry substantially impregnates a plurality of interstices between the assembly of fibers.

Embodiment 21. The method of embodiment 18, wherein the polymer film coating includes an ethylene methyl acrylate, ethylene vinyl acetate, polyethylene terephthalate, polyamide, hot melt adhesive, fluoropolymer, polyolefin, or combination thereof.

Embodiment 22. The method of embodiment 18, wherein applying the polymer film includes extruding directly onto the glass mat or laminating via an adhesive.

Embodiment 23. The method of embodiment 18, wherein the glass mat is used as a facer for a construction product.

Embodiment 24. The method of embodiment 23, wherein the construction product comprises a gypsum wall board or a cement board.

The following examples are provided to better disclose and teach processes and compositions of the present invention. They are for illustrative purposes only, and it must be acknowledged that minor variations and changes can be made without materially affecting the spirit and scope of the invention as recited in the claims that follow.

EXAMPLES

Example 1

A standard urea-formaldehyde binder with 3% acrylic latex is applied to a wet laid glass mat via a wet laid process at a solid content of 15% by dilution with whitewater. The glass mats include an assembly of glass fibers having a diameter of about 16 microns. The mats are cured while constrained between two parallel copper plates. In order to produce mats with low caliper, the mats are dried in a convection oven at 60° C. for 5 minutes prior to curing between the copper plates. Copper alloy 110 was selected for its high thermal conductivity. The thermal conductivity of this alloy is 226 Btu/ft2/ft/hr/° F. or 390 W/(m*K). Each plate weighs about 5.8 pounds which puts about 0.04 psi of pressure on the mat with the plate lying on top with no additional clamping force.

Figure 2:
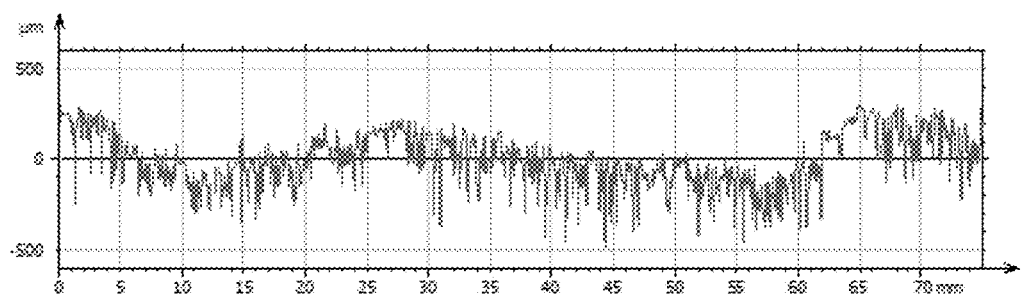
FIG. 2 is a plot of the surface profile of a glass mat cured without dimensional constraint.
Figure 3:
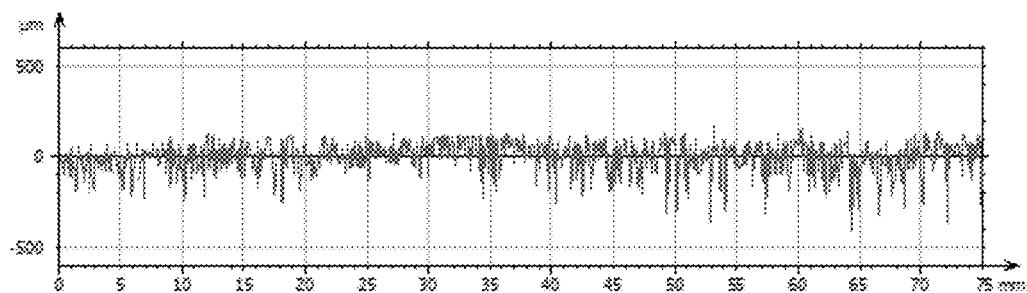
FIG. 3 is a plot of the surface profile of a glass mat cured with dimensional constraint.

A number of glass mats cured under dimensional constraint are compared to glass mats cured without dimensional constraint. Half of the mats are fabricated between initially cool copper plates with a cure of 180° C. for 16 minutes and half were cured for 180° C. for 3 minutes without the plates. The longer cure time with the plates is to heat the plates to the curing temperature. In addition to the samples cured with the copper plate samples being ~30% thinner than the controls, they are also much flatter. While the controls tend to be wavy, the copper plate samples are smooth and uniform. Plots of the surface profiles of the samples can be seen in FIGS. 2 and 3. FIG. 2 contains the surface profile for a mat that has been cured without dimensional constraint. FIG. 3 contains the surface profile for a mat that has been cured under dimensional constraint. Clearly, the local noise and waviness of the glass mat when cured without dimensional constraint is minimized when cured under dimensional constraint.

Example 2

Several exemplary glass mats are formed and tested for roughness and flatness with cure with and without dimensional constraint as described in Example 1. The different exemplary glass mats produced can be seen in Table 1. "h fibers" are 11 μm in diameter, "k fibers" are 13 μm in diameter, and "m fibers" are 16 μm in diameter. LOI, or loss on ignition, represents the % binder in the final product by weight, and weight is the amount of glass fibers in the mat. Binder as indicated as "standard" is a 96% urea-formaldehyde (UF) binder and 85/15 is 85% acrylic binder mixed with 15% UF binder.

TABLE 1

| Ex. | Name | LOI | Weight | Fiber | Fiber Length | Fiber amt (g) | Binder |
|---|---|---|---|---|---|---|---|
| 1 | 0.9 k short | 20 | 0.9 | k | 0.75 | 3.75 | Standard |
| 2 | k short | 20 | 1.8 | k | 0.75 | 7.5 | Standard |
| 3 | h short | 20 | 1.8 | h | 0.75 | 7.5 | Standard |
| 4 | Short | 20 | 1.8 | m | 0.75 | 7.5 | Standard |
| 5 | Control | 20 | 1.8 | m | 1.25 | 7.5 | Standard |
| 6 | 85% acrylic | 20 | 1.8 | m | 1.25 | 7.5 | 85/15 |
| 7 | 100% acrylic | 20 | 1.8 | m | 1.25 | 7.5 | 100% acrylic |
| 8 | 15% LOI | 15 | 1.8 | m | 1.25 | 7.5 | Standard |
| 9 | 30% LOI | 30 | 1.8 | m | 1.25 | 7.5 | Standard |

Figure 4:
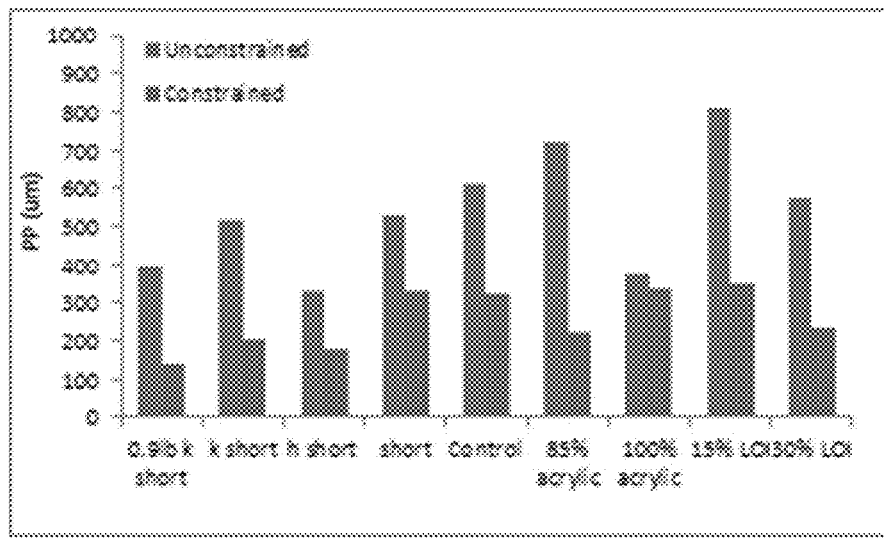
FIG. 4 is a plot of Pp (maximum height of the summits, i.e. height between the highest peak and the mean plane) for a number of exemplary glass mats cured with and without dimensional constraint.
Figure 5:
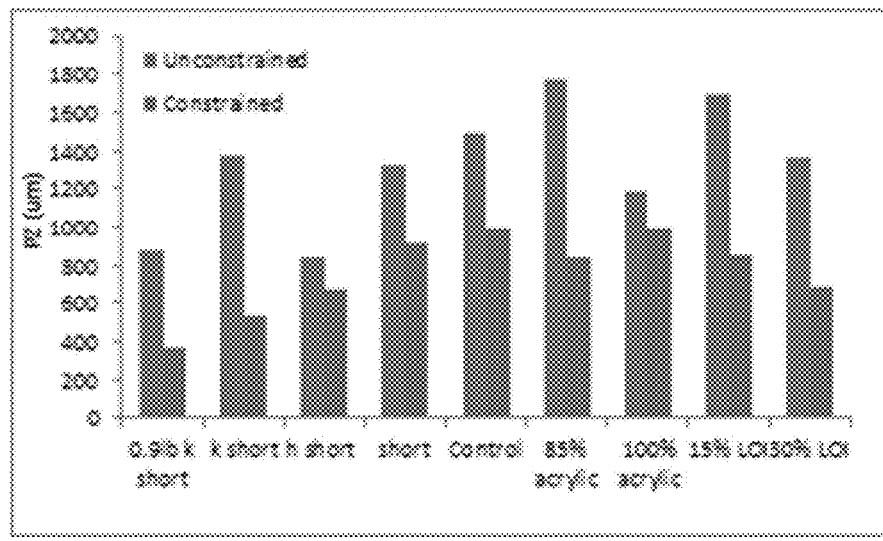
FIG. 5 is a plot of Pz (ten point height of the surface, i.e. the mean distance between the 5 highest peaks and 5 deepest holes) for a number of exemplary glass mats cured with and without dimensional constraint.
Figure 6:
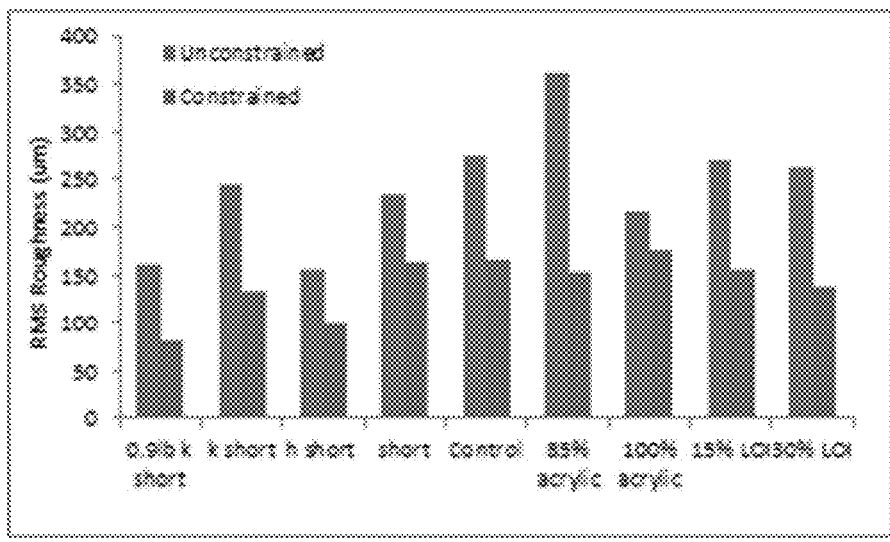
FIG. 6 is a plot of RMS (root-mean-square deviation of the surface, i.e. the efficient value for the amplitudes of the surface) for a number of exemplary glass mats cured with and without dimensional constraint.

The results of Pp (maximum height of the summits, i.e. height between the highest peak and the mean plane) can be seen in FIG. 4, Pz (ten point height of the surface, i.e. the mean distance between the 5 highest peaks and 5 deepest holes) can be seen in FIG. 5, and RMS (root-mean-square deviation of the surface, i.e. the efficient value for the amplitudes of the surface) can be seen in FIG. 6. Pp and Pz are metrics of flatness. RMS is a metric of roughness. All measurements are done with a Nanovea 3D Optical Surface Profilometer using a white light chromatic aberration technique with a 7.5 centimeter line scan in any particular direction. Clearly, the cure under dimensional constraint significantly reduces roughness and increases flatness.

Figure 7:
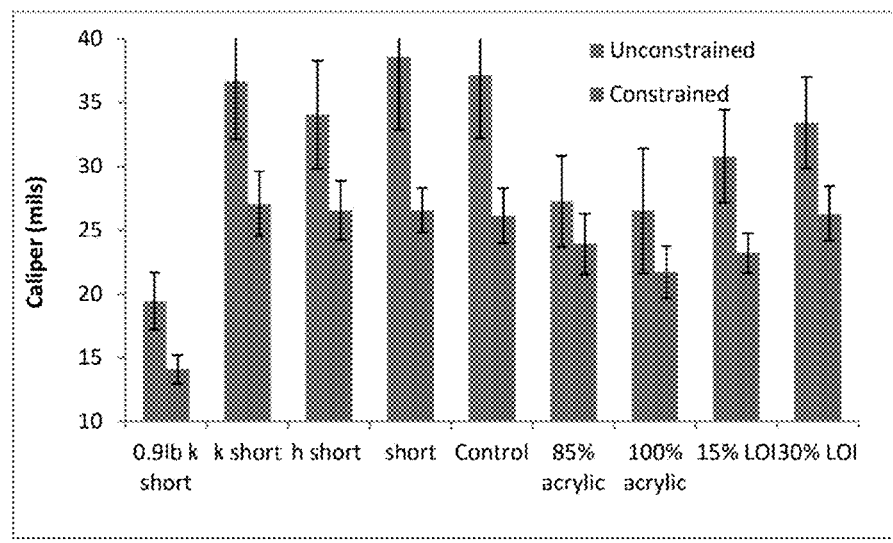
FIG. 7 is a plot of caliper for a number of exemplary glass mats cured with and without dimensional constraint.
Figure 8:
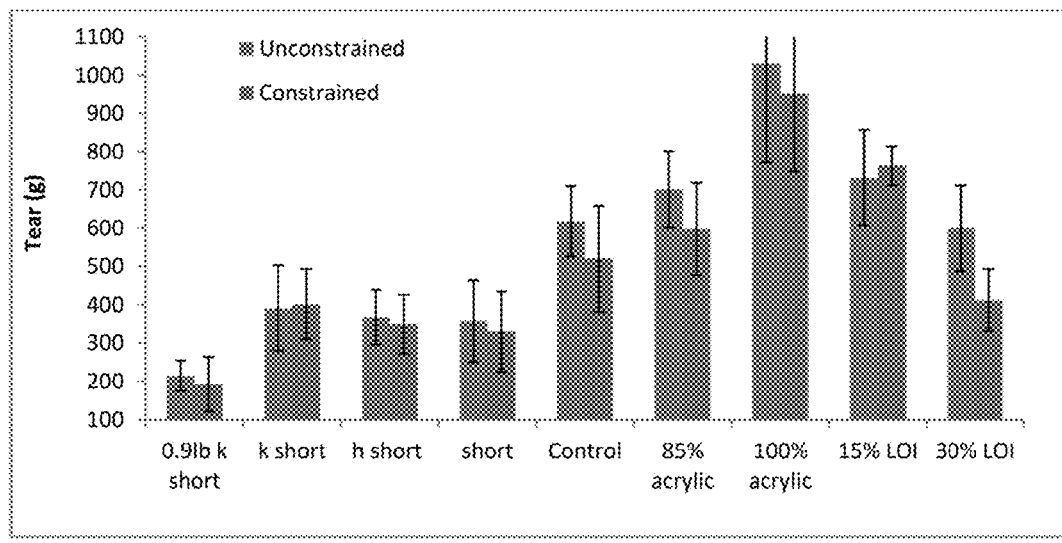
FIG. 8 is a plot of mat Elmendorf tear strength for a number of exemplary glass mats cured with and without dimensional constraint.
Figure 9:
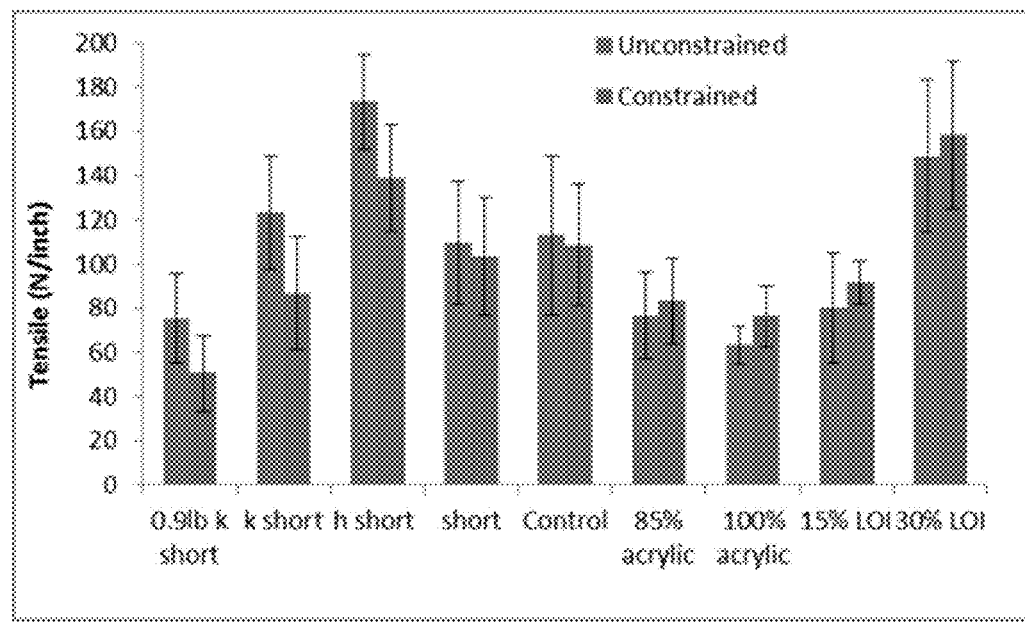
FIG. 9 is a plot of tensile strength for a number of exemplary glass mats cured with and without dimensional constraint.

The results of the caliper, tear, and tensile measurements are seen in FIGS. 7, 8, and 9, respectively. The data clearly shows that the curing under dimensional constraint reduces caliper significantly for all weights, fiber types, fiber lengths, binder compositions, and binder amounts. Caliper is reduced by about 20-30% for glass mats cured under dimensional constraint, with the exception of the binder containing acrylic. Although not being bound by theory, acrylic has less bubbling and air voids formed during cure compared to a UF binder. Accordingly, the change in caliper, although reduced, is not as significant when the binder formulation does not contain any components which cure through a condensation reaction.

Regarding the relative performance of the mat, heavier mats have higher tensile, tear, and caliper. Fiber type has little impact on caliper or tear. "h" fibers have the highest tensile with the "k" and "m" fibers having similar tensile values. Longer fibers do not significant impact mat tensile or caliper, but do increase the tear values. High loadings of acrylic binder increases tear and reduces tensile and caliper values. LOI increases tensile and caliper values and decreases tear values.

Overall, curing of the glass mat under dimensional constraint is effective at high UF levels and increases the tensile of high acrylic binders. The effect on mat tear is LOI dependent.

Example 3

Several exemplary glass mats are formed by running a roll of dried but only partially cured mat through a rotocure process. The example is conducted using a mat specification of 1.8 lb/100 ft$^2$, 16 micron diameter fibers, and a standard urea-formaldehyde binder resin. A reduced thickness is achieved using this process without damaging the glass mat property. Table 2 below lists the physical properties of dimensionally constrained cured glass mats made via a Rotocure in comparison to conventionally cured and prepared construction glass mat products without dimensional constraint. The Rotocure dimensionally constrains the glass mat between a heated metal drum and a steel belt. It is clearly indicated in Table 2 that this process is capable of generating a reduced caliper mat with the dimensionally constrained curing process without damaging other properties of the glass mat. It is remarkable to point out that the mat product resulted at Rotocure process can have a 16 mil thickness, an over 50% reduction of thickness from a conventional 34 mil product that is cured without dimensional constraint.

TABLE 2

Constrained cured glass mat with in-specification property for roofing application
Constrained Cured Trial Mat Property Summary

| | 16 Micron Glass Fiber mat | | | |
|---|---|---|---|---|
| Product: Mat Properties | Specification Minimum | Target | Specification Maximum | Low Caliper Pilot Mat |
| Basis weight (lb/100 sq.ft) | 1.7 | 1.8 | 1.9 | 1.82 |
| MD Tensile (lb$_f$)[1] | 60 | 85 | | 129 |
| CD Tensile (lb$_f$)[1] | 30 | 45 | | 59 |
| MD Rentention (%) | 55 | 75 | 90 | 85 |

TABLE 2-continued

Constrained cured glass mat with in-specification property for roofing application
Constrained Cured Trial Mat Property Summary

| | 16 Micron Glass Fiber mat | | | |
|---|---|---|---|---|
| Product: Mat Properties | Specification Minimum | Target | Specification Maximum | Low Caliper Pilot Mat |
| Loss on Ignition (LOI) | 17 | 19.5 | 25 | 19.1 |
| Thickness[4] (0.001") | 30 | 34 | 38 | 15.7 |

Figure 10:
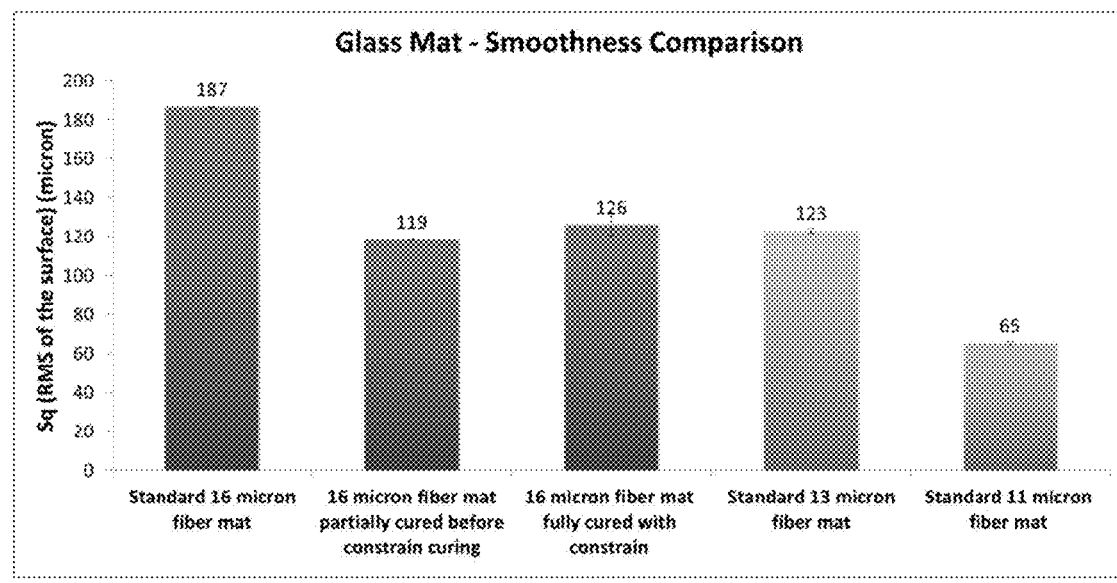
FIG. 10 is a plot of surface smoothness of exemplary mats cured with and without dimensional constraint.
Figure 11:
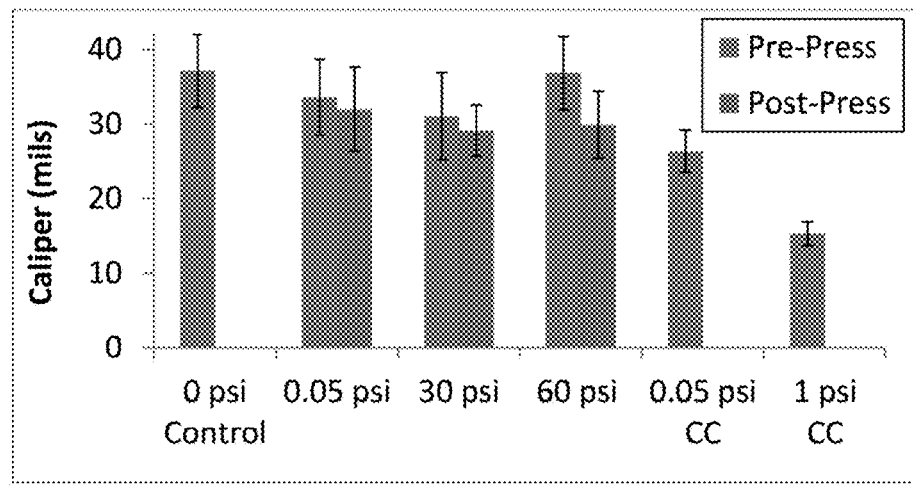
FIG. 11 is a plot of caliper of exemplary mats cured and pressed under varying conditions.
Figure 12:
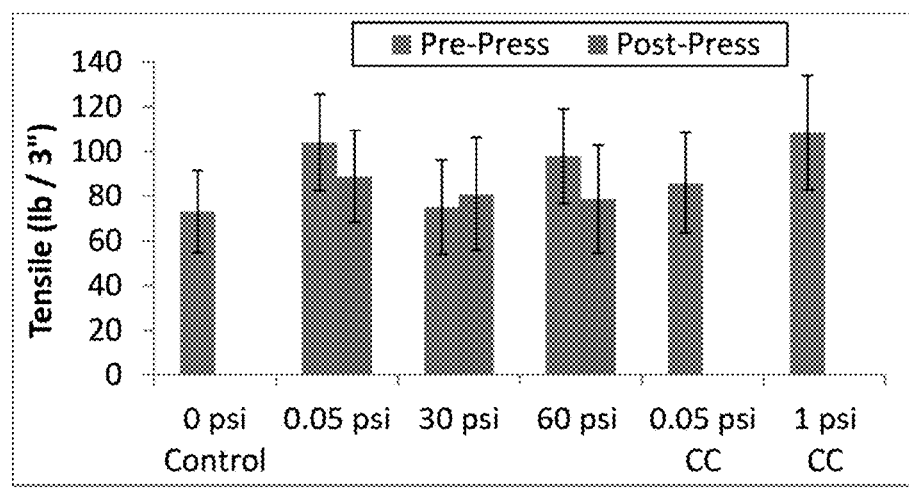
FIG. 12 is a plot of tensile strength of exemplary mats cured and pressed under varying conditions.
Figure 13:
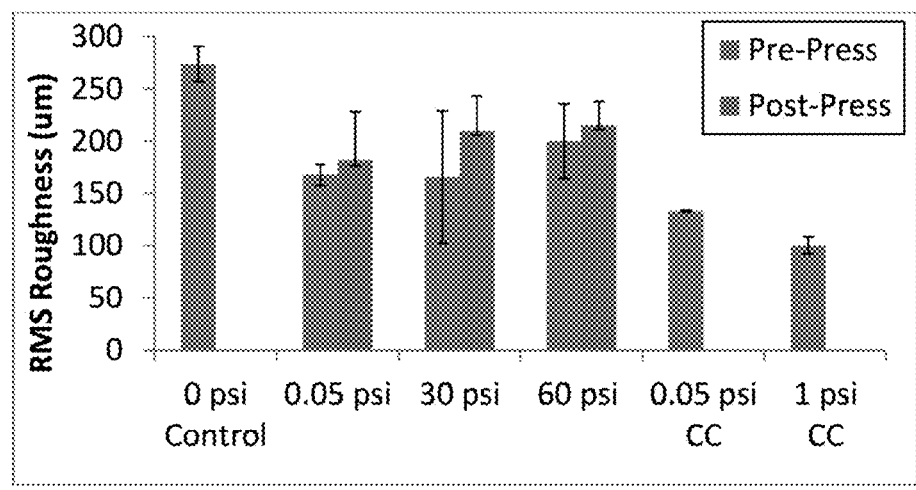
FIG. 13 is a plot of RMS roughness of exemplary mats cured and pressed under varying conditions.
Figure 14:
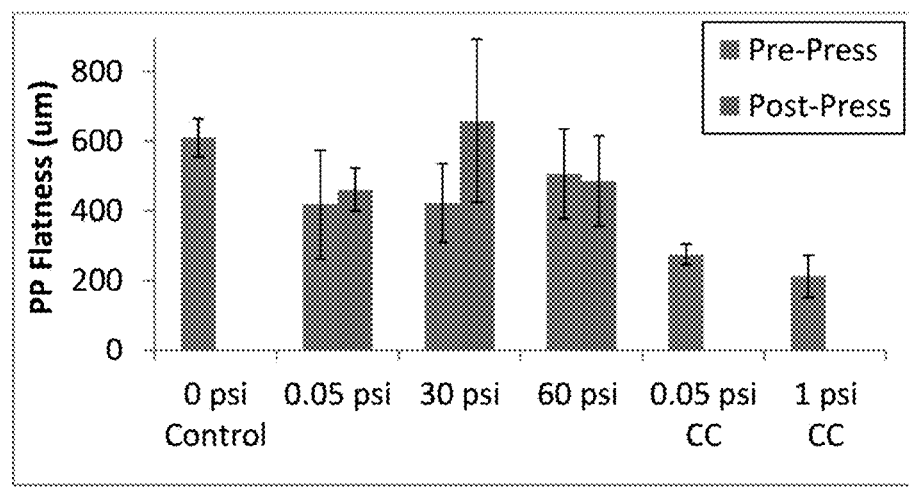
FIG. 14 is a plot of Pp flatness of exemplary mats cured and pressed under varying conditions.
Figure 15:
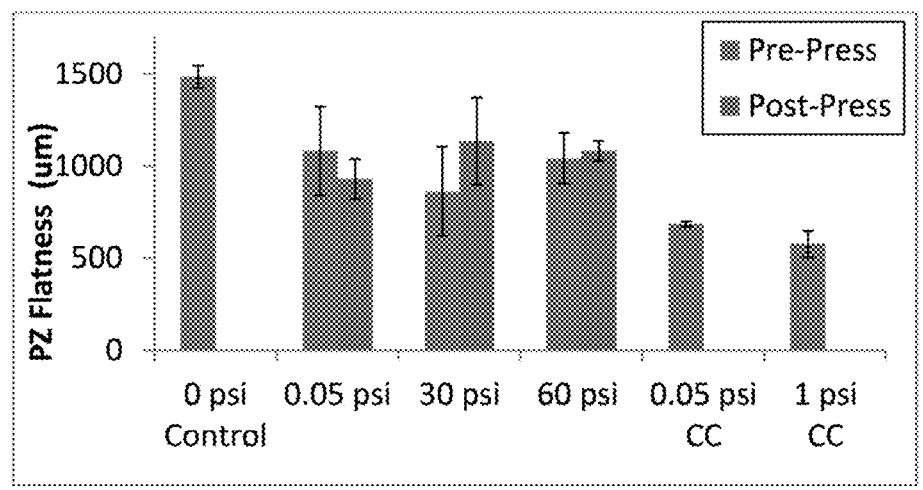
FIG. 15 is a plot of Pz flatness of exemplary mats cured and pressed under varying conditions.

Measurements are also carried out on the mat smoothness. Tensile measurements are taken based on a test procedure put forward by American Roofing Manufacturer Association, test method 4-82 relative tensile strength. The test is modified for glass mat as an industry standard from an original 2" width of test strip to 3" width. All tensile values are pounds per three inches. Trial mats made via Rotocure (labelled "Rotocured") and a flatbed (labelled "Flat bed cured") are made using an assembly of glass fibers having a 16 micron fiber diameter. In comparison to the Rotocure, the flatbed uses two parallel steel belts to dimensionally constrain the glass mat. Surface smoothness is measured and comparison is made to benchmark conventional glass mat (labelled "Conventional production mat"), and an ultra-smooth mat (labelled "11 micron fiber GM"), both cured without dimensional constraint. FIG. 10 illustrates the differences made by the compressed curing process on the smoothness of the glass mat.

From the figure, it is evident that the dimensionally constrained curing process is able to reduce the surface roughness of the glass mat, giving it a much improved feel-to-touch for a facer application. The dimensionally constrained glass mat from Flat bed cured and Rotocured processes produces a surface smoothness in between the original Conventional production Mat 16 micron M fiber product and the 11 micron H fiber product, thus leaving it close to the smoothness results achievable for a 13 micron K fiber product. Accordingly, the dimensionally constrained glass mats have a surface smoothness less than the Conventional production Mat made with an equivalent fiber diameter size. It is also surmised that a glass mat having an assembly of glass fibers with a larger micron fiber diameter size, such as 16 microns as shown above, that is cured under dimensional constraint will have a surface roughness equivalent or even less than a glass mat with an assembly of glass fibers having a smaller micron fiber diameter size cured without dimensional constraint. Notably, lower diameter fibers are typically more expensive, thus the use of high diameter fiber is more cost effective.

Example 4

A standard urea-formaldehyde binder with 1.5% acrylic latex is applied to a wet laid glass mat via a wet laid process at a solid content of 15% by dilution with whitewater. The glass mats are 10 inch by 10 inch sheets that include an assembly of glass fibers having a diameter of about 16 microns. All the mats are dried in a convection oven at 60° C. for 5 minutes to drive off water prior to curing. Cure conditions can be seen in Table 3.

TABLE 3

| Name | Press Process | Curing |
|---|---|---|
| 0 psi control | None | Convection, 180 C., 3 minutes |
| 0.05 psi pre | Cold copper plates | Convection, 180 C., 3 minutes |
| 0.05 psi post-P | Cold copper plates | Convection, 180 C., 3 minutes |
| 30 psi pre | Cold carver press with PTFE liner | Convection, 180 C., 3 minutes |
| 30 psi post-P | Cold carver press with PTFE liner | Convection, 180 C., 3 minutes |
| 60 psi pre | Cold carver press with PTFE liner | Convection, 180 C., 3 minutes |
| 60 psi post-P | Cold carver press with PTFE liner | Convection, 180 C., 3 minutes |
| 0.05 psi CC | Copper plates in oven | 180 C., 12 minutes (cold plates) |
| 1 psi CC | Dual belt press laminator | 210 C., 20 seconds |

A number of glass mats cured under dimensional constraint (labelled as "CC" and compared to glass mats cured without dimensional constraint but either pre-pressed prior to cure ("pre") or post-pressed after cure ("post-P"). Results can be seen in Table 4 and FIGS. 11-15 for Tensile, Caliper, Pp Flatness, Pz Flatness, and RMS Roughness with a 7.5 centimeter line scan.

TABLE 4

| Name: | Pressure (psi) | Tensile (lbs/3") | Caliper (mils) | Pp (um) | Pz (um) | RMS (um) |
|---|---|---|---|---|---|---|
| Control | 0 | 77 | 37 | 610 | 1485 | 274 |
| 0.05 psi pre | 0.05 | 104 | 34 | 419 | 1083 | 168 |
| 0.05 psi post-P | 0.05 | 89 | 32 | 462 | 931 | 182 |
| 30 psi pre | 30 | 75 | 31 | 423 | 861 | 166 |
| 30 psi post-P | 30 | 81 | 29 | 659 | 1135 | 210 |
| 60 psi pre | 60 | 98 | 37 | 507 | 1042 | 200 |
| 60 psi post-P | 60 | 78 | 30 | 486 | 1082 | 216 |
| 0.05 psi CC | 0.05 | 86 | 26 | 275 | 688 | 133 |
| 1 psi CC | 1 | 108 | 16 | 212 | 577 | 100 |

Notably, the samples cured under compression have improved caliper, flatness (Pp and Pz) and roughness compared to the samples placed under pressure before or after cure.

Example 5

Figure 16:
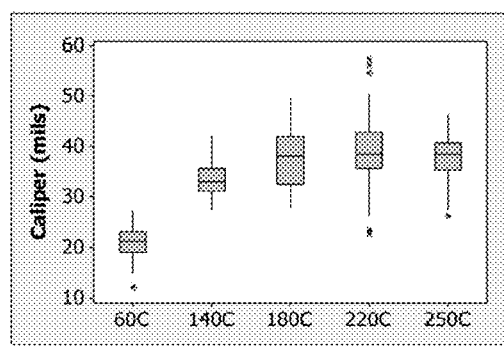
FIG. 16 is a plot of caliper of exemplary mats heated at various temperatures.

Several equivalent samples of a glass mat and standard urea-formaldehyde binder are heated at various temperatures and the caliper is measured. At 60° C., the binder in the glass mat is dried and not cured. At the higher temperatures, the binder in the mat cures. As seen in FIG. 16, the caliper of a dried sheet is significantly lower than a cured handsheet. FIG. 16 clearly demonstrates on how the caliper increases and expansion of the glass mat occurs due to the cure of the binder (without dimensional constraint) and the formation of voids.

Certain features, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A method of making a glass mat comprising:
providing an assembly of glass fibers comprising a chopped bundle of glass fibers;
applying a binder composition to the assembly of glass fibers, wherein the binder comprises an organic resin; and
curing the binder composition while dimensionally constraining the assembly of glass fibers, wherein dimensional constraining includes directly contacting a first major surface and a second major surface of the assembly of glass fibers between two substantially parallel surfaces to prevent expansion of the chopped bundle of glass fibers and binder composition in a vertical direction during cure; wherein a vertical thickness of the glass mat is fixed after cure.

2. The method of claim 1, wherein the dimensional constraint has a distance between the substantially parallel surfaces less than or equal to a thickness of the naturally cured glass mat.

3. The method of claim 1, wherein at least one of the substantially parallel surfaces has a thermal conductivity of at least about 10 W/·K.

4. The method of claim 3, wherein curing the binder composition comprises heating at least one of the substantially parallel surfaces to a temperature sufficient to heat the mat and cure the binder composition.

5. The method of claim 1, further comprising substantially drying the glass mat prior to cure.

6. The method of claim 5, wherein drying the glass mat is at a temperature wherein the glass mat does not reach the cure temperature of the binder.

7. The method of claim 1, further comprising substantially embedding the glass mat in a cementitious slurry or applying a polymer film coating to the glass mat surface.

8. The method of claim 7, wherein the glass mat is used as a facer for a construction product.

* * * * *